(12) United States Patent
Will et al.

(10) Patent No.: US 12,722,544 B2
(45) Date of Patent: Sep. 1, 2026

(54) CHILD SEAT WITH RECLINE MECHANISM

(71) Applicant: Britax Child Safety, Inc., Fort Mill, SC (US)

(72) Inventors: Adam Mark Will, Indian Land, SC (US); Lin Hsin Feng, Taibao City (TW); Hou Jen En, Puzi City (TW); Chou Yu Te, Fort Mill, SC (US); Yu Yung Fu, Fort Mill, SC (US)

(73) Assignee: Britax Child Safety, Inc., Fort Mill, SC (US)

( * ) Notice: Subject to any disclaimer, the term of this patent is extended or adjusted under 35 U.S.C. 154(b) by 146 days.

(21) Appl. No.: 18/183,690

(22) Filed: Mar. 14, 2023

(65) Prior Publication Data

US 2023/0294576 A1 Sep. 21, 2023

Related U.S. Application Data

(60) Provisional application No. 63/319,868, filed on Mar. 15, 2022.

(51) Int. Cl.
*B60N 2/28* (2006.01)

(52) U.S. Cl.
CPC ......... *B60N 2/2878* (2013.01); *B60N 2/2839* (2013.01); *B60N 2/2851* (2013.01); *B60N 2/2863* (2013.01)

(58) Field of Classification Search
CPC .. B60N 2/2878; B60N 2/2839; B60N 2/2821; B60N 2/2863; B60N 2/2851; B60N 2/286; B60N 2/2875
See application file for complete search history.

(56) References Cited

U.S. PATENT DOCUMENTS

| | | | | |
|---|---|---|---|---|
| 6,139,101 | A | 10/2000 | Berringer | |
| 6,428,099 | B1 * | 8/2002 | Kain .................... | B60N 2/2839 297/256.16 |
| 7,625,043 | B2 | 12/2009 | Hartenstine | |
| 7,748,782 | B2 | 7/2010 | Chen | |
| 8,123,295 | B2 * | 2/2012 | Hutchinson .......... | B60N 2/2821 297/256.13 |
| 9,010,857 | B2 * | 4/2015 | Chen .................... | B60N 2/2875 297/256.13 |
| 9,022,472 | B2 | 5/2015 | Chen | |
| 9,114,739 | B2 | 8/2015 | Conway | |
| 9,315,124 | B2 | 4/2016 | Lehman | |
| 9,592,751 | B2 | 3/2017 | Kirstein | |
| 10,336,219 | B2 | 7/2019 | Mason | |
| 10,730,414 | B2 | 8/2020 | Pleiman | |
| 11,155,188 | B2 | 10/2021 | Mason | |
| 2006/0261651 | A1 * | 11/2006 | Nolan ................. | B60N 2/2887 297/250.1 |
| 2009/0179470 | A1 * | 7/2009 | Bass .................... | B60N 2/2866 297/216.12 |
| 2020/0223333 | A1 * | 7/2020 | Mason ................ | B60N 2/2875 |
| 2022/0001776 | A1 | 1/2022 | Mason | |
| 2022/0355713 | A1 | 11/2022 | Longenecker | |
| 2023/0014310 | A1 | 1/2023 | Longenecker | |

* cited by examiner

*Primary Examiner* — Syed A Islam
(74) *Attorney, Agent, or Firm* — K&L Gates LLP

(57) ABSTRACT

Systems and methods for a child seat in accordance with embodiments of the invention are disclosed. In one embodiment, a child seat includes an outer shell having a seat portion and a back portion, and a base assembly having a mechanism for mounting the car seat and a recline mechanism.

20 Claims, 6 Drawing Sheets

CHILD SEAT WITH RECLINE MECHANISM

PRIORITY CLAIM AND CROSS-REFERENCE TO RELATED APPLICATIONS

The present application claims priority and benefit of U.S. Provisional Patent App. No. 63/319,868 filed Mar. 15, 2022, titled CONVERTIBLE CAR SEAT WITH RECLINE MECHANISM, the entire contents of which are incorporated by reference herein and relied upon.

TECHNICAL FIELD

The present invention generally relates to child restraint systems, and more specifically to seats specially adapted for vehicles.

BACKGROUND

Child seats are designed to protect children in vehicles from the effects of impacts or sudden changes in motion (e.g., sudden acceleration, sudden deceleration, etc.).

SUMMARY

Systems and methods for a child seat in accordance with embodiments of the invention are disclosed. In one embodiment, a child seat includes an outer shell having a seat portion and a back portion and a base assembly having a mechanism for mounting the car seat and a recline mechanism.

Other objects, advantages and novel features, and further scope of applicability of the present invention will be set forth in part in the detailed description to follow, and in part will become apparent to those skilled in the art upon examination of the following, or may be learned by practice of the invention. The objects and advantages of the invention may be realized and attained by means of the instrumentalities and combinations particularly pointed out in the claims.

BRIEF DESCRIPTION OF THE DRAWINGS

The description will be more fully understood with reference to the following figures, which are presented as exemplary embodiments of the invention and should not be construed as a complete recitation of the scope of the invention, wherein.

DETAILED DESCRIPTION

Turning now to the drawings, systems and methods for a child seat in accordance with embodiments of the inventions are disclosed. A child seat is a car seat that is used for children. Generally, child seats include two modes of operation, rear-facing and forward facing. In the rear-facing mode, child seats can be used for newborn and toddlers. In the forward-facing mode, child seats can be used for children that fit the height and weight requirements. While it is important for a car seat to be properly secured to a vehicle (e.g., vehicle seat or underlying structure) to protect the child, it is also important that the car seat be properly sized and configured to support the child correctly and provide maximum protection in the event of an impact. As a child grows, their proportions change rapidly in the early years of life and any selected seat configuration will be quickly outgrown as the child develops. For example, in early infancy a child's bones are supple and capable of more flexure than those of an adult; however, their head and neck are particularly vulnerable to impact or sudden directional changes in momentum as the head is large and the supporting musculature of the neck is still developing. Further, children have various amounts of head control. Generally, older children have increased head control and can tolerate a more upright position in a car seat. Thus, ensuring that the child seat is in the correct inclined position will support the child both for everyday comfort and for an impact event.

Child seats in accordance with embodiments of the invention include a recline mechanism. The recline mechanism allows a user to adjust the angle of the child seat relative to the base. By allowing a user to adapt the angle of the car seat to the child, a child seat provides added comfort and safety for an impact event. For example, with a rear-facing car seat, a child seat in an upright position could contact the vehicle seat back. A child seat at an inclined position could provide the child with additional leg space between the child seat and the vehicle seat back.

Systems and methods for child seats with a recline mechanism in accordance with embodiments of the invention are described in more detail below.

Child Seat

Figure 1:
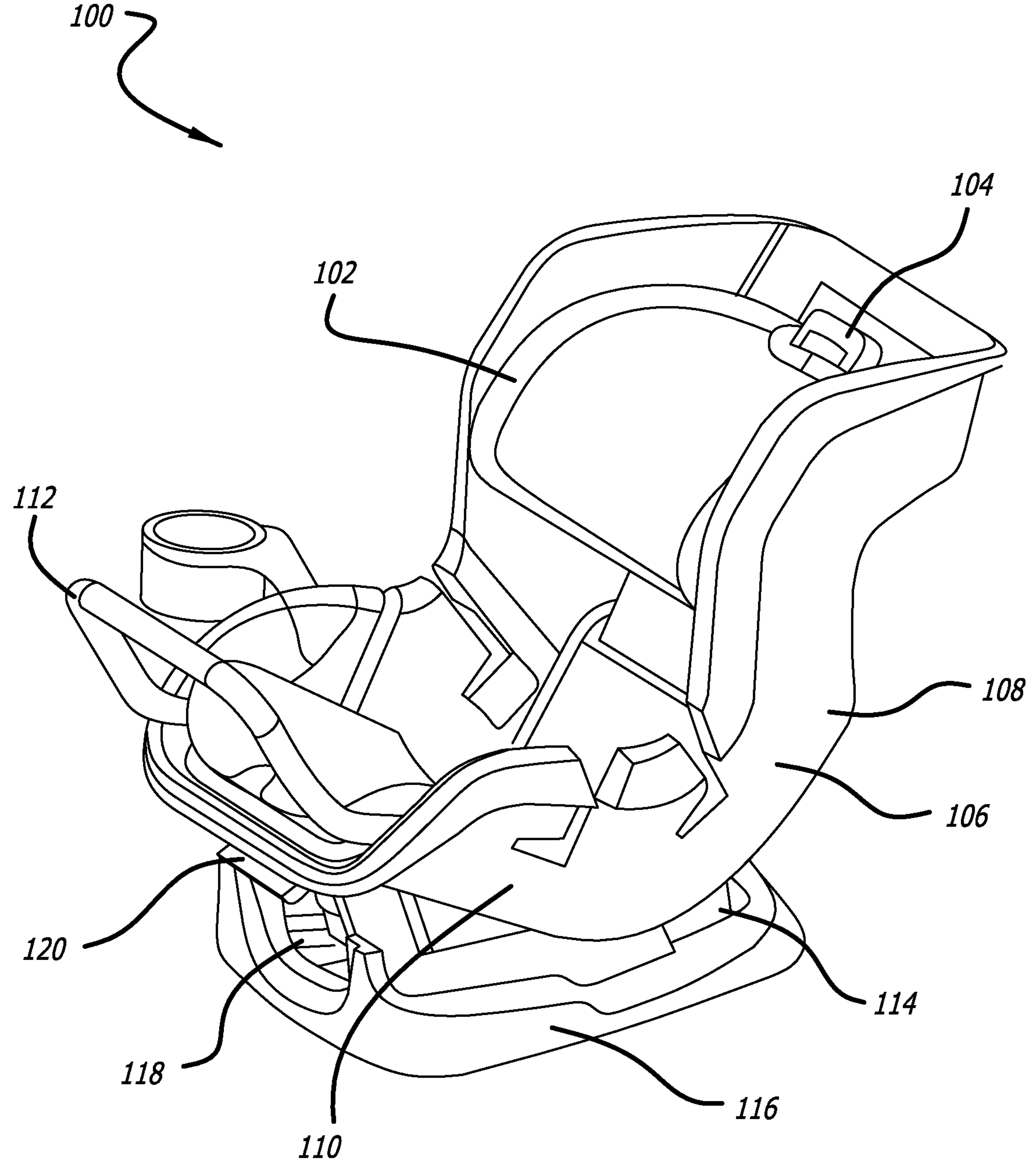
FIG. 1 is a rendering of a child seat having a recline mechanism in accordance with an embodiment of the invention.

FIG. 1 is a rendering of a child seat having a recline mechanism in accordance with an embodiment of the invention. The child seat 100 includes an outer shell 106 and a base assembly 116. The base assembly 116 includes belt paths and/or a variety of mechanisms, such as a click-tight belt retainer, for mounting the child seat 100 on a vehicle seat in a vehicle. The base assembly 116 further includes a recline mechanism 118. In many embodiments, the recline mechanism 118 includes a recline adjustment handle 120, which allows a user to change the incline of the child seat 100. The outer shell 106 of the child seat 100 includes a seating portion 110 and a back portion 108. The seating portion 110 includes a seat holding the child's legs and the back portion 108 includes a seat back holding the child's upper body. In various embodiments, the back portion 108 includes an adjustable headrest 102 supporting the child's head. In several embodiments, the adjustable headrest 102 of the child seat 100 includes a handle 104, which allows a user to change the position of the adjustable headrest 102.

In many embodiments, the child seat 100 can include an energy absorption system 114. In an impact event, the energy absorption system 114 absorbs energy from the impact, limiting the movement of the child seat 100 during the impact event. In a variety of embodiments, the child seat 100 includes an anti-rebound bar 112. Anti-rebound bar 112 can be used when the child seat 100 is installed in a rear-facing configuration and braces against the back of the vehicle seat. The anti-rebound bar 112 helps prevent the child seat 100 from rotating into the vehicle seat back during an impact event when a user installs the child seat 100 in a rear-facing configuration.

The implementation of FIG. 1 is an illustrative embodiment of a child seat and many configurations are appropriate. For example, a number of child seats, including those that use alternative elements to actuate a recline mechanism for adjusting the incline of the child seat, can be utilized as appropriate to the requirements of specific applications of embodiments of the invention.

Recline Mechanism

In a variety of embodiments, the base assembly of the child seat incorporates a recline mechanism. The recline mechanism allows a user to adjust the incline of the seating portion of the child seat relative to the base assembly.

Figure 2A:
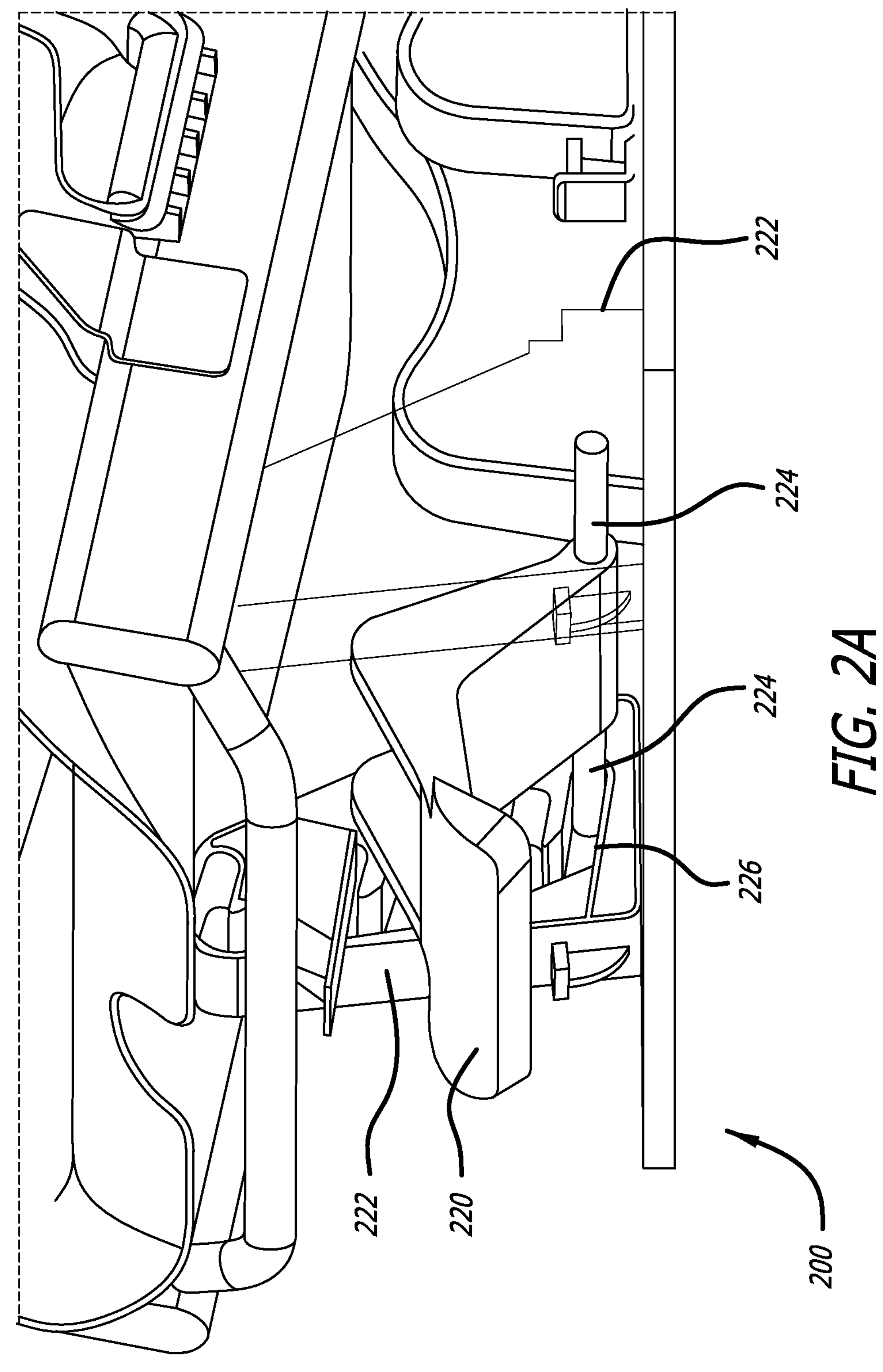
FIGS. 2A-B are renderings of a recline mechanism for a child seat in accordance with an embodiment of the invention.
Figure 2B:
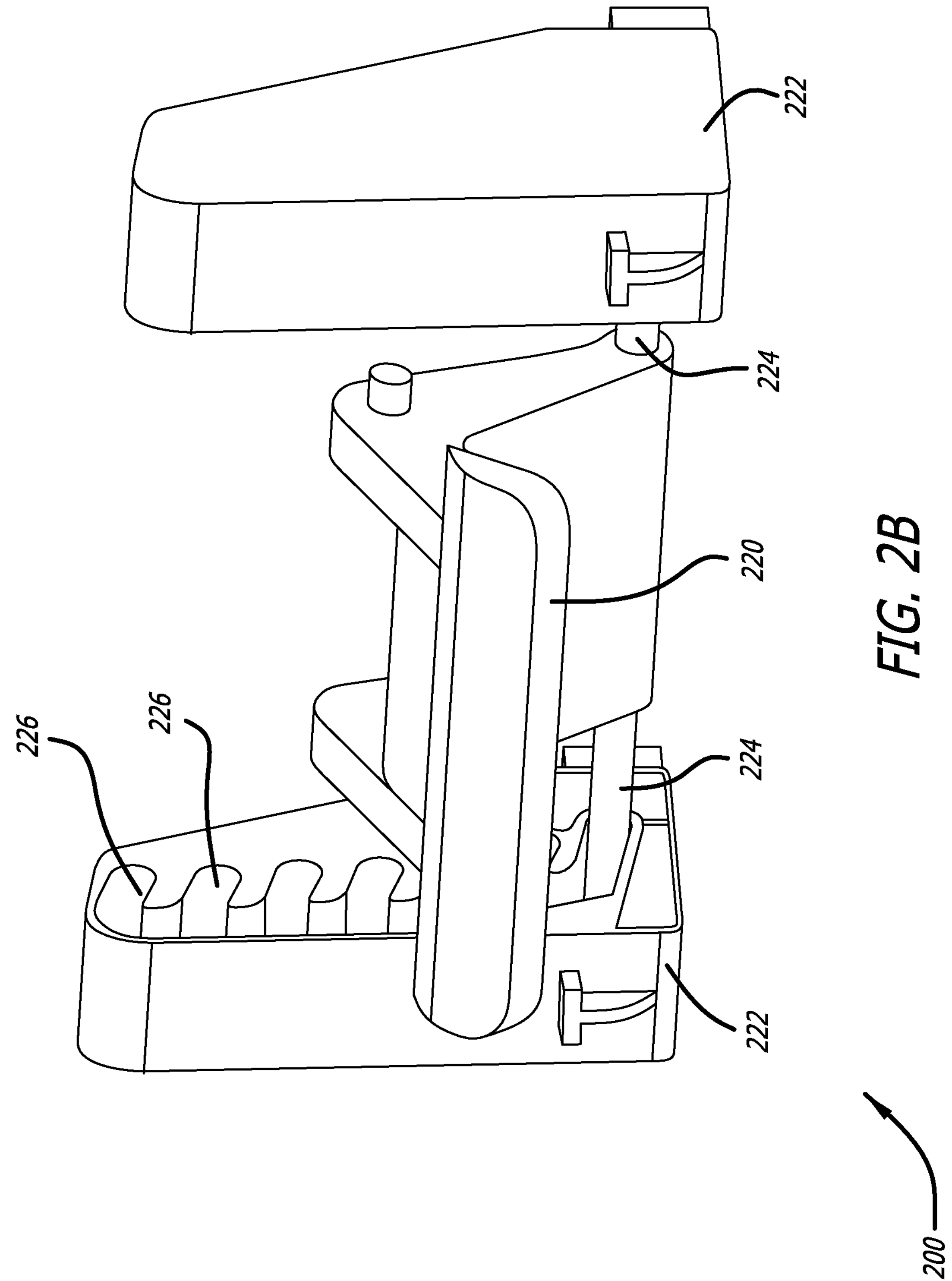

FIGS. 2A-B are renderings of a recline mechanism for a child seat in accordance with an embodiment of the invention. The recline mechanism 200 includes a recline adjustment handle 220. The recline adjustment handle 220 includes a first end, a second end, and a pivot point disposed between the first end and second end. The first end and the second end meet at an approximately 90 degree intersection between the first end and the second end. In various embodiments, the first end and the second end can meet at a variety of angles. Further, the recline adjustment handle can have a variety of shapes. For example, the recline adjustment handle can have a continuous structure defining a parabola. The recline adjustment handle 220 also includes bars 224 coupled to and extending from the second end of the recline adjustment handle 220. The recline mechanism 200 includes a limiting mechanism. In various embodiments, the limiting mechanism takes the form of side walls 222 having pockets 226. The bars 224 extending from the second end of the recline adjustment handle 220 engage the pockets 226 of the side walls 222. The pockets 226 of the side walls 222 define various incline positions of the outer shell. In many embodiments, the number and height of the pockets can be varied to provide differing incline positions. The engagement of the bars 224 with the pockets 226 of the side walls 222 correspond to a locked or unlocked position. In the locked position, the bars 224 engage the pockets 226 of the side walls 222 to prevent the seating portion from moving relative to the base assembly. In the unlocked position, the bars 224 are disengaged from pockets 226 of the side walls 222.

Further, the side walls 222 are formed with separation geometry forcing the bars 224 into a pocket 226 without allowing the bar 224 to balance between pockets 226. The side walls 222 separate the pockets 226 with a sloped structure. For example, if a user attempts to actuate the recline mechanism 200 but mistakenly releases the recline adjustment handle 220 such that the bars 224 contact the structure of the side walls 222 between the pockets 226, the sloped structure will force the bars 224 into a pocket 226. In many embodiments, the slope and structure of the side walls 222 located between the pockets 226 can be varied. For example, the structure could be defined as a U-shape. Additionally, the structure could come to a point, including, for example, a V-shape. The slope of the V-shape would force the bars into a pocket depending on what side of the V-shape the bars contacted. These example structures would prevent the bars from balancing between the pockets forcing the bars to engage the pockets.

The recline adjustment handle 220 allows a user to unlock the recline mechanism 200 and adjust the incline of the seating portion of the child seat relative to the base assembly. A user can manipulate the first end of the recline adjustment handle 220 in an upward direction. When the first end is manipulated upward, the recline adjustment handle 220 rotates about the pivot point moving the second end of the recline adjustment handle 220. Likewise, the bars 224 that extend from the second end of the recline adjustment handle 220 move, disengaging the bars 224 from the pockets 226 of the side walls 222. While disengaged, the recline mechanism 200 is in the unlocked position, which allows a user to adjust the incline of the seat portioning relative to the base assembly to a desired position. Once the user reaches the desired incline, the user can release the first end of the recline adjustment handle 220. Once released, the recline adjustment handle 220 again pivots about the pivot point reengaging the bars 224 with the pockets 226 of the side walls 222, placing the recline mechanism 200 in the locked position.

The implementations of FIGS. 2A-B are illustrative of a recline mechanism for a child seat and many configurations are appropriate. For example, any of a number of pockets, slots, or apertures can be used to engage the component extending from the recline adjustment handle for a locked position. Additionally, a number of bars, rods, or protrusions can be used to extend from the recline adjustment handle to engage the pockets of the side walls. The cross sectional shape of these extensions can also be varied so long as the cross sectional shape complements the respective pocket. In many embodiments, the recline adjustment handle can actuate the extensions in various directions. For example, when a user actuates the recline adjustment handle, the extensions could be pulled inward toward the handle to disengage the pockets. The user could then adjust the incline and release the handle causing the extensions to extend outward and reengage the pockets of the side walls.

Figures 3A, 3B:
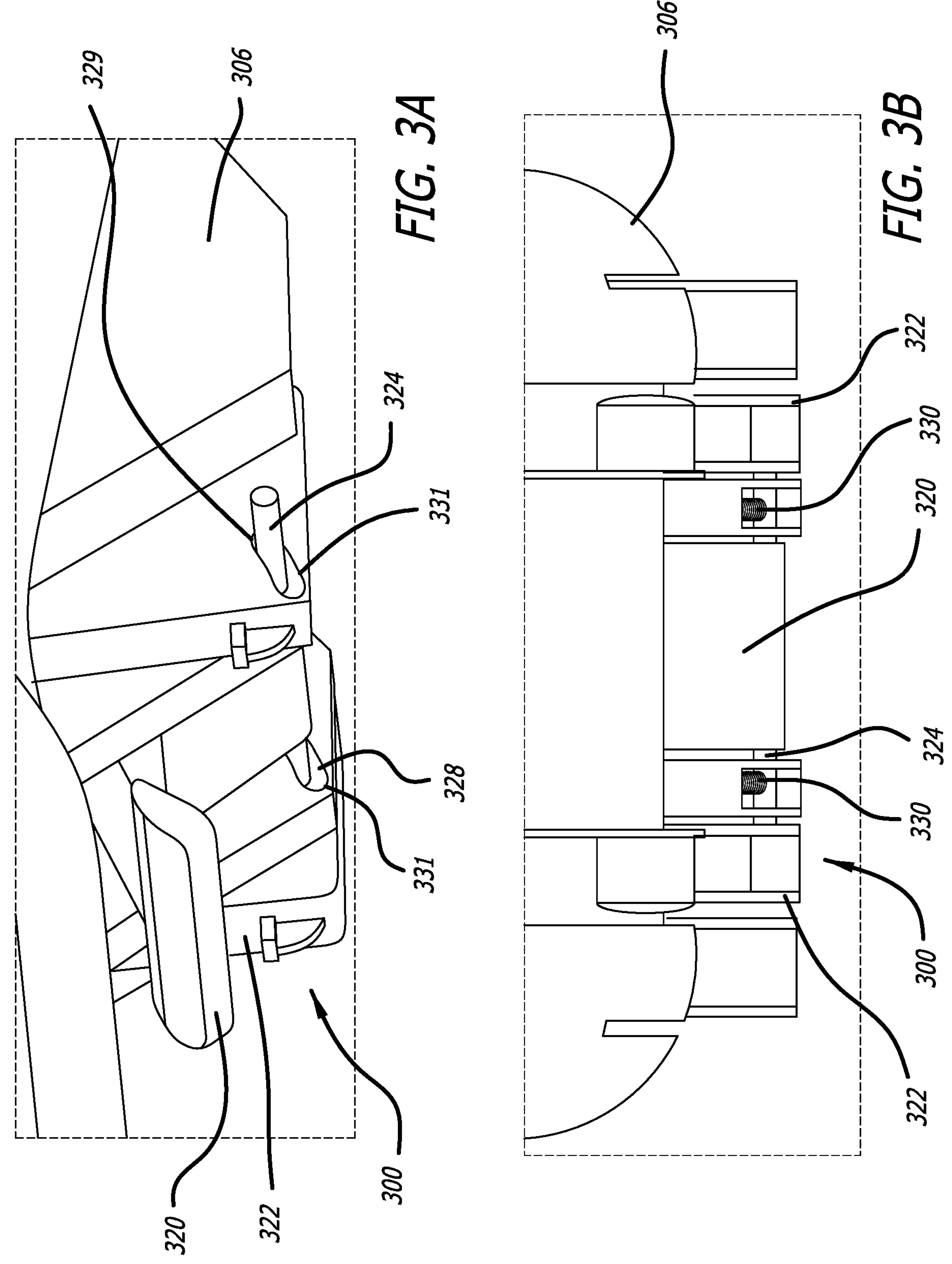
FIGS. 3A-B are renderings of a recline mechanism coupled to a child seat in accordance with an embodiment of the invention.

FIGS. 3A-B are renderings of a recline mechanism coupled to a child seat in accordance with an embodiment of the invention. As shown in FIG. 3A, the recline mechanism 300 includes a recline adjustment handle 320, bars 324, and side walls 322 having pockets. The recline mechanism 300 further includes channels 328 having a first end 329 and a second end 331 on a shell 306.

The bars 324 of the recline mechanism 300 extend from the recline adjustment handle 320 and through the channels 328 of the shell 306 to engage the pockets of the side walls 322. The channels 328 of the shell 306 define an area through which the bars 324 can travel. At the first end 329 of the channels 328, the bars 324 engage pockets of the side walls 322 and are in a locked position. When the bars 324 are located at the second end 331 of the channels 328, the bars 324 are disengaged from the pockets of the side walls 322 and are in the unlocked position. A user can adjust the incline of the seat portion when the bars 324 are in the unlocked position at the second end 331 of the channels 328.

As shown in FIG. 3B, the shell 306 includes springs 330. In many embodiments, the springs 330 located within the channels 328 of the shell 306 couple the shell 306 and the bars 324. The springs 330 urge the bars 324 towards the first end 329 of the channels 328 to maintain the locked position. Once the recline mechanism is activated by a user, the bars 324 travel from the first end 329 to the second end 331 of the channels 328. At the second end 331 of the channels 328, the recline mechanism 300 is in the unlocked position and can be adjusted. After the user adjusts the incline and releases the recline adjustment handle 320, the springs 330 urge the bars 324 back to the first end 329 of the channels 328 and return the recline mechanism 300 to the locked position.

The implementations of FIGS. 3A-B are illustrative of the coupling between the recline mechanism and the shell and many configurations are appropriate. For example, a rubber component could be used to couple the shell to the recline mechanism. The rubber component could provide a tensile force to urge the bars into a locked position. Further, the rubber component could use its elastic properties to urge the bars into a locked position after being extended many times over long-term use of the recline mechanism. Additionally, a magnet could be used to couple the shell and the recline mechanism. The magnet would urge the bars into the pockets in a locked position. When a user actuates the recline mechanism and overcomes the magnetic coupling, the distance between the bars and the magnetic would increase, decreasing the force of the magnet on the bars. As the user releases the recline adjustment handle, the magnet would urge the bars back into the pockets and apply a maximum force in the locked position as the distance between the bars and the magnet is at a minimum.

Figure 4A:
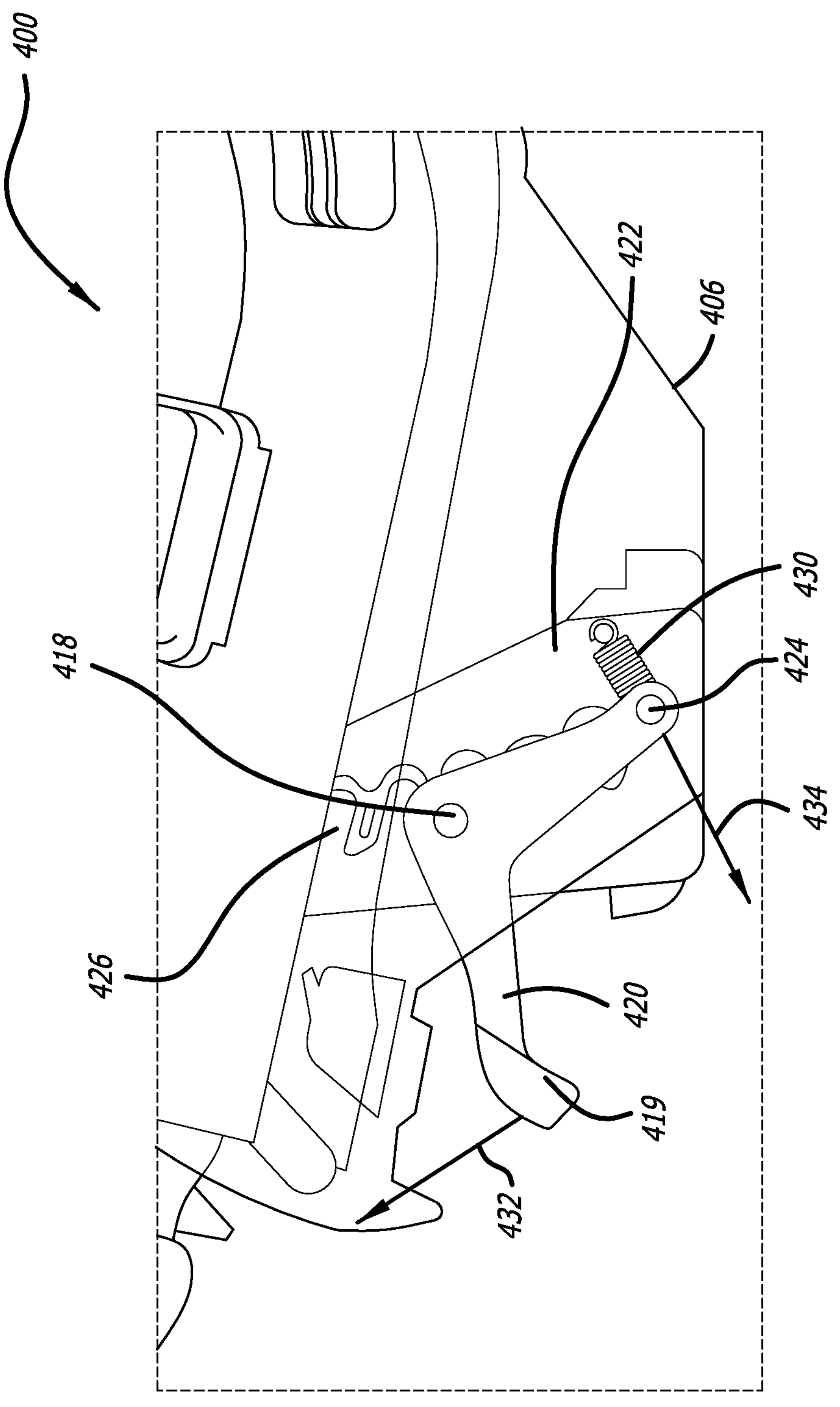
FIGS. 4A-B are conceptual renderings of the operation of the recline mechanism for a child seat in accordance with an embodiment of the invention.
Figure 4B:
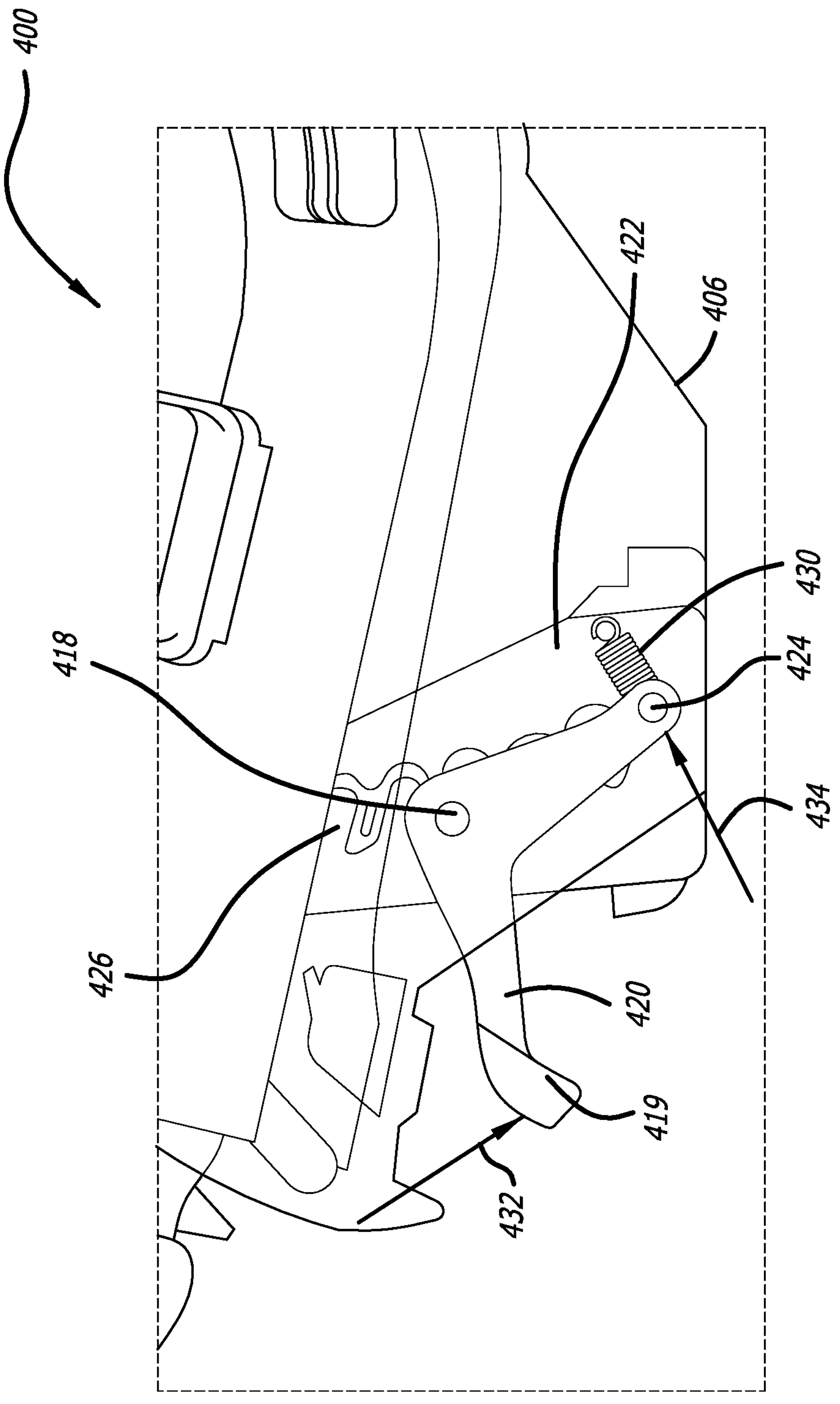

FIGS. 4A-B are renderings of the operation of the recline mechanism for a child seat in accordance with an embodiment of the invention. As shown in FIG. 4A, the recline mechanism 400 is in the locked position. The recline mechanism 400 allows a user to change the incline of the seating portion of the child seat relative to the base assembly by moving the recline adjustment handle 420 having a first end and a second end. The first end of the recline adjustment handle 420 defines a handle 419 that can be used to rotate the recline adjustment handle 420 about a pivot axis and the second end is coupled to the bars 424. To change the incline of the seating portion of the convertible car, a user can move the handle 419 of recline adjustment handle 420 in the direction of arrow 432. The recline adjustment handle 420 pivots, translating the user's force to the direction of arrow 434. As the handle 419 of the recline adjustment handle 420 is being pulled by the user, the recline adjustment handle 420 rotates about the pivot point defined by protrusion 418 causing the bars 424 coupled to second end of the recline adjustment handle 420 to move in the direction of arrow 434. This movement is approximately opposite the force of the springs 430. By pulling the handle 419 of the recline adjustment handle 420 in direction of arrow 432, the force of the springs 430 on the bars 424 is overcome, and the bars 424 travel from the first end of the channels to the second end of the channels. Movement from the first end of the channels to the second end of the channels disengages the bars 424 from the pockets 426 moving the recline mechanism 400 from the locked position to the unlocked position. Once the bars 424 are disengaged from the pockets 426 and the recline mechanism 400 is in the unlocked position, the user is free to adjust the incline to a desired angle while maintaining an upward force on the handle 419 of the recline adjustment handle 420.

As shown in FIG. 4B, while in the unlocked position and when the seat portion is at the desired incline, the user can release the handle 419 of the recline adjustment handle 420. As the user releases the handle 419, the force of the springs 430 pull the bars 424 in a direction of arrow 436 to pivot the recline adjustment handle 420 and reengage the pockets 426 of the side walls. Once the bars 424 reengage the pockets, the recline mechanism 400 returns to the locked position at the desired incline.

The implementations of FIGS. 4A-B are illustrative of the operation of the recline mechanism for a child seat and many configurations are appropriate. A number of operations, including those that utilize alternative elements for locking and unlocking or pivoting the recline adjustment handle, can be utilized as appropriate to the requirements of specific applications of embodiments of the invention.

Although the embodiments described herein relate to a child seat, those skilled in the art would also contemplate a similar implementation across a variety of seats and seat-related products such as, but not limited to, booster seats, infant seats, and convertible car seats.

Although the present invention has been described in certain specific aspects, many additional modifications and variations would be apparent to those skilled in the art. In particular, any of the various processes described above can be performed in alternative sequences and/or in parallel in order to achieve similar results in a manner that is more appropriate to the requirements of a specific application. It is therefore to be understood that the present invention can be practiced otherwise than specifically described without departing from the scope and spirit of the present invention. Thus, embodiments of the present invention should be considered in all respects as illustrative and not restrictive. It will be evident to the annotator skilled in the art to freely combine several or all of the embodiments discussed here as deemed suitable for a specific application of the invention. Throughout this disclosure, terms like "advantageous", "exemplary" or "preferred" indicate elements or dimensions which are particularly suitable (but not essential) to the invention or an embodiment thereof, and may be modified wherever deemed suitable by the skilled annotator, except where expressly required. Accordingly, the scope of the invention should be determined not by the embodiments illustrated, but by the appended claims and their equivalents.

What is claimed is:

1. A child seat comprising:

an outer shell having a seating portion, and a back portion, wherein the seating portion includes a seat configured to hold a child's lower body, wherein the back portion includes a seat back configured to hold a child's upper body, wherein the outer shell has a front end corresponding with a front edge of the seating portion;

a base assembly, wherein the base assembly has a base front end and a rear end, and wherein the base assembly has a base bottom parallel to a surface on which the base assembly is placed; and a recline mechanism operatively coupled to the base assembly and the outer shell, wherein the recline mechanism selectively adjusts the incline of outer shell relative to the base assembly;

wherein the recline mechanism operatively couples to the front end of the outer shell and the base front end;

wherein the recline mechanism comprises:

a handle;

at least one engaging component extending from the handle;

at least one side wall; and at least one limiting mechanism fixed to the base assembly, wherein the at least one limiting mechanism defines a plurality of pockets to engage with the at least one engaging component, wherein the at least one limiting mechanism is perpendicular to the base bottom, wherein the recline mechanism is operatively situated at the front end of the outer shell and the base front end, wherein the at least one side wall includes a channel with a first channel end and a second channel end, wherein the at least one engaging component extends through the channel, wherein the at least one engaging component translates from the first channel end to the second channel end, and wherein the handle further comprises a first end and a second end, wherein there is a pivot point between the first end and second end.

2. The child seat of claim 1, wherein the child seat further comprises an adjustable headrest coupled to the back portion with an actuator configured to selectively change the height of the headrest as defined as the relative distance between a distal end of the back portion and a proximal end of the headrest.

3. The child seat of claim 1, wherein the child seat can be installed in a rear-facing configuration in which the seating portion of the child seat faces a vehicle seat.

4. The child seat of claim 3, wherein the child seat further comprises an anti-rebound bar coupled to the front of the seating portion and configured to interact with the vehicle seat to prevent the child seat from rotating towards the vehicle seat when force is applied on the child seat in a direction towards the vehicle seat.

5. The child seat of claim 1, wherein the child seat further comprises an energy absorption system configured to absorb forces imparted on the child seat.

6. The child seat of claim 1, wherein when the at least one engaging component is engaged with one of the plurality of pockets of at least one of the limiting mechanism, the outer shell is held static relative to the base assembly.

7. The child seat of claim 1, wherein actuating the handle allows a user to selectively disengage the at least one engaging component from an engaged one of the pockets, wherein the user can selectively translate the at least one engaging component to a second one of the pockets.

8. The child seat of claim 6, wherein each one of the plurality of pockets defines a different arc corresponding with a different angle at which the outer shell is held static relative to the base assembly.

9. The child seat of claim 1, wherein the at least one limiting mechanism defines the plurality of pockets in a chevron or parabola geometry.

10. The child seat of claim 1, wherein the at least one engaging component extends from the handle at the second end.

11. The child seat of claim 1, wherein the recline mechanism further comprises at least one urging component that orients the at least one engaging component such that it engages with a pocket.

12. The child seat of claim 11, wherein the at least one urging component is a spring.

13. A child seat comprising:

an outer shell having a seat portion and a back portion, wherein the outer shell has a front end corresponding with a front edge of the seat portion;

a base assembly, wherein the base assembly has a base front end and a rear end, and wherein the base assembly has a base bottom parallel to a surface on which the base assembly is placed; and a recline mechanism operatively situated between to the outer shell and the base assembly, the recline mechanism comprising:

a handle;

at least one engaging component extending from the handle;

at least one side wall; and at least one limiting mechanism fixed to the base assembly, wherein the at least one limiting mechanism defines a plurality of pockets to engage with the at least one engaging component, wherein the at least one limiting mechanism is perpendicular to the base bottom, wherein the recline mechanism is operatively situated at the front end of the outer shell and the base front end, wherein the at least one side wall includes a channel with a first channel end and a second channel end, wherein the at least one engaging component extends through the channel, wherein the at least one engaging component translates from the first channel end to the second channel end, and wherein the handle further comprises a first end and a second end, wherein there is a pivot point between the first end and second end.

14. The child seat of claim 13, wherein the at least one engaging component extends from the handle at the second end.

15. The child seat of claim 13, wherein the geometry of the plurality of pockets orients the at least one engaging component to engage with a pocket if it has not been received by a pocket.

16. The child seat of claim 13, wherein actuating the handle disengages the at least one engaging component and a first pocket.

17. The child seat of claim 16, wherein when the at least one engaging component is disengaged from a first pocket, the outer shell can be moved relative to the base assembly.

18. The child seat of claim 13, wherein the recline mechanism further comprises at least one urging component that orients the at least one engaging component such that it engages with a pocket.

19. The child seat of claim 18, wherein the at least one urging component is a spring.

20. The child seat of claim 13, wherein the at least one limiting mechanism defines the plurality of pockets in a chevron or parabola geometry.

* * * * *